Figure 1:
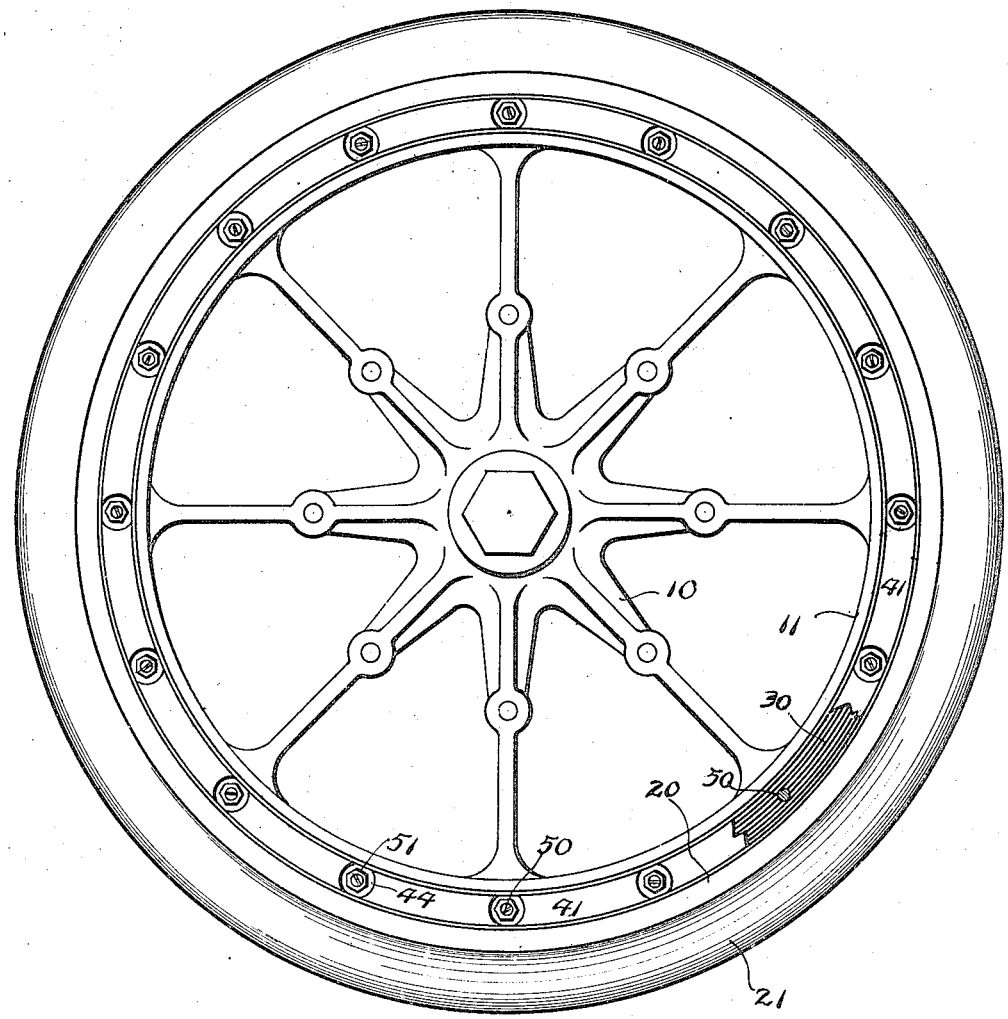

A. HAUSCHILD.
COMBINED CUSHIONING AND FASTENING DEVICE FOR TIRES.
APPLICATION FILED APR. 4, 1916.

1,223,788.

Patented Apr. 24, 1917.
2 SHEETS—SHEET 1.

INVENTOR:
Adelbert Hauschild,
BY Albert H. Baker
ATTY.

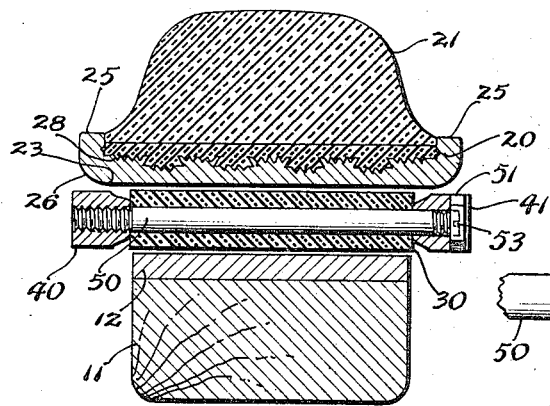
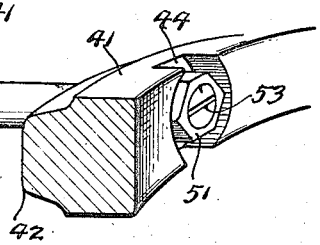
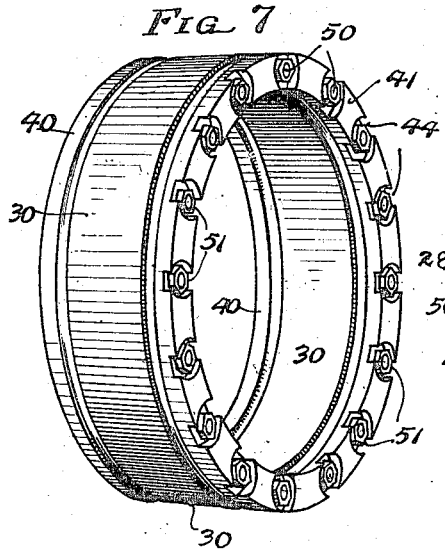
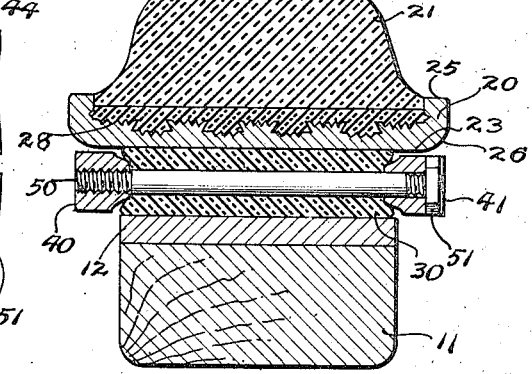
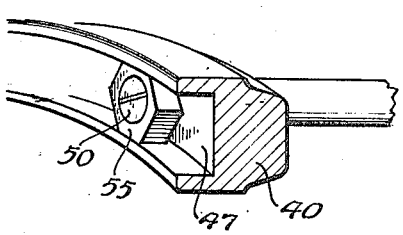
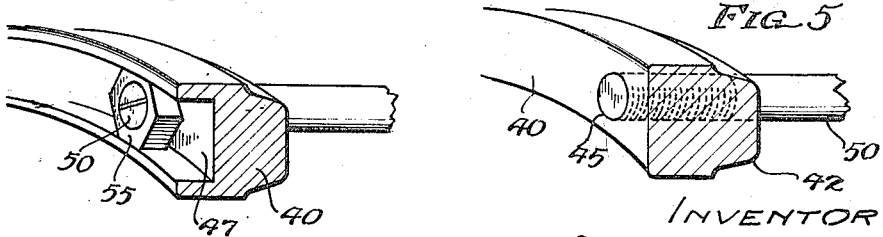

UNITED STATES PATENT OFFICE.

ADELBERT HAUSCHILD, OF AKRON, OHIO.

COMBINED CUSHIONING AND FASTENING DEVICE FOR TIRES.

1,223,788.

Specification of Letters Patent.

Patented Apr. 24, 1917.

Application filed April 4, 1916. Serial N 88,852.

*To all whom it may concern:*

Be it known that I, ADELBERT HAUSCHILD, a citizen of the United States, residing at Akron, in the county of Summit and State of Ohio, have invented a certain new and useful Improvement in a Combined Cushioning and Fastening Device for Tires, of which the following is a full, clear, and exact description, reference being had to the accompanying drawings.

This invention relates to a peculiar fastening device for effectively securing on a wheel center rubber tires which are vulcanized or otherwise fastened to metal bases or rims, or reinforced by internal steel wires. At the same time my fastening device provides a yielding cushion to absorb the running shocks and jars. My invention is adapted to coact with the usual wheel center, the inner periphery of the base of the tire being larger than the outer periphery of the wheel center, and my locking cushion, located in the intermediate space thus provided, firmly securing the tire to the center without providing any fixed or metallic connection between them.

My locking device consists of a resilient cushioning ring made of rubber or similar material, which is adapted to be easily put into the annular space between the wheel center and the tire base, a pair of pressure distributing rings (preferably of metal), on opposite sides of the resilient ring, and means for forcing the pressure distributing rings toward each other to laterally compress the entire ring and cause it to expand radially outward and inward, thus binding the tire to the wheel center. While the binding is so effective that no strains incident to use will loosen the tire from the wheel member, at the same time the elastic ring allows sufficient up-and-down play to give a material cushioning effect to the wheel.

Practice has demonstrated that my fastening device is very well adapted to bear heavy loads and to be subjected to the severe driving strains which are incident to the use of trucks. There has, heretofore, been considerable difficulty in providing a satisfactory wheel having a removable rim or tire adapted for these conditions, as the usual wedge method of securing removable rims to wheels, heretofore employed is not satisfactory for trucks, where it is important that there be nothing to become loose, and the tire must have a firm and effective supporting seat, and at the same time easy removability should be provided.

In my invention, I prefer to draw the metallic pressure distributing rings on the opposite sides of the elastic ring together by means of bolts which pass through the elastic ring and are suitably secured to the inner metallic ring and have nuts on their outer ends which are adapted to be turned against the outer ring to compress the intermediate cushioning ring. Inasmuch as the metallic rings have no connection with either the tire base or the wheel center, and the rubber ring has a plain cylindrical interior and exterior, it follows that my locking device may be used with wheel centers having a cylindrical exterior and tire bases having a cylindrical interior. Accordingly I can use the standard wheel centers and the standard tires of the ordinary pressed-on type, simply taking a larger size of tire than would normally fit the wheel center, or a smaller size of wheel center than usual for a given tire, and placing my locking device between such members.

As the wheels of the S. A. E. standard vary by two inches difference in diameter, it follows that the next larger size of tire, about a given center, leaves an annular space of approximately one inch across between the two. I therefore prefer to make my rubber cushion of slightly less than one inch in thickness. At intervals through this cushion I make holes which are adapted to be occupied by bolts extending beyond each side of the cushion and into the metallic pressure distributing rings. These bolts may be secured by any suitable means to the inner pressure distributing ring, while on their outer ends they have heads or nuts adapted to force the outer pressure distributing ring inwardly.

The metallic rings have slightly smaller radial dimension than the rubber ring before it is put in place, so that the inner metal ring, together with the rubber ring, may be conveniently slid across the wheel center and within the tire. Then the tightening of the nuts on the outer ends of the bolts is all that is necessary to lock the tire to the wheel center. Accordingly my fastening device may be kept in stock and sold as a standard article of manufacture comprising an annular rubber ring, metallic rings on the opposite sides thereof, through bolts and nuts, such construction having an inner diameter corresponding to a standard size of wheel center, and an outer diameter corresponding to the next larger size of tire, allowing sufficient margin to enable an easy installation.

The steel base type of tire has become uniformly recognized as the most efficient on the market for trucks, both in reliability and in length of service. The only effective way heretofore practised for securing such tires on the wheel centers has been to make the tire base with an inner periphery very slightly smaller than the outer periphery of the center, and force the tire on by a powerful hydraulic press. This system has required truck users to send their trucks or wheels for tire replacements to an efficiently equipped service station, thus entailing much loss of time while the truck is idle. Notwithstanding this time-loss, the pressed-on tire has become the standard for heavy trucks, because the wedging devices are not satisfactory for the heavy strains to which the truck wheels are subjected and frequently interfere with the ready removability of the tire. My fastening device, on the contrary, enables the owner of the truck to make his own replacements, at his own garage, without delay and without the necessity of removing the wheels from the truck. No expensive apparatus is required. The tire is held as firmly to the wheel center as if forced on by hydraulic pressure, and, in addition, a very noticeable cushioning effect is obtained.

My invention is clearly illustrated in the drawings hereof, in which Figure 1 is a side elevation of a wheel with part of the outer pressure distributing ring broken away to more clearly show the cushioning ring; Fig. 2 is a radial cross section of the outer portion of such wheel before the cushion has been compressed; Fig. 3 is a similar view after the cushion has been compressed; Fig. 4 is a perspective view of a portion of the outer metallic ring and the bolt and nut for drawing it inwardly; Fig. 5 is a perspective view of a portion of an inner metallic ring which may be employed and has one means for securing the bolt to the metallic ring; Fig. 6 is a view similar to Fig. 5, showing a modified means for securing the bolt to the inner ring; Fig. 7 is a perspective of the complete fastening device ready for installation.

In the drawings, 10 designates a wheel center which is shown as having suitable spokes and a felly 11. This felly may be of metal or wood, as desired. In the latter instance it is preferably provided with a metallic band or permanent rim 12, as shown in Figs. 2 and 3. The outer periphery of the wheel center or band 12 is a plain cylindrical surface. 20 indicates the tire-carrying rim and 21 the rubber tire secured thereto. The inner surface of the rim 20 is a plain cylinder, as indicated at 23, and the edges of this cylindrical surface curve outwardly and merge with the outer face of side flanges 25, as shown at 26.

In the standard pressed-on type of tire, the rubber is solid and is vulcanized to the outer face of the tire-carrying rim within the flanges 25 thereof. In this type the outer face is preferably grooved and roughened as shown at 28, to enable the rubber to be securely attached to the metal. Other types of rubber tires having a cylindrical inner surface or rim may be employed.

The cushioning ring of my invention is designated 30. It is cylindrical both interiorly and exteriorly and is of a width approximately equal to the width of the rim of the wheel center. This ring is preferably of comparatively pliable but tough rubber. Before it is compressed to clamp the parts together, it is materially smaller in its radial dimension than the distance between the wheel center and tire-carrying rim, as is clearly shown in Fig. 2.

40 and 41 indicate the pressure distributing rings lying on opposite sides of the rubber ring, and 50 designates the bolts lying parallel with the axis of the wheel and extending through the rubber ring and engaged at their inner ends with the ring 40 and at their outer ends extending through the ring 41 and provided with nuts 51, the turning of which draws the two fastening rings together. This inward movement compresses the rubber laterally and causes it to expand radially both inwardly and outwardly, bringing it into the form shown in Fig. 3, in which condition it effectively binds the wheel center and tire together.

The inner faces of the rings 40 and 41 are preferably chamfered or rounded at the edges of their cushion-engaging faces, as shown at 42, to allow a slight space for the edge portion for the rubber to flow, so that the expansion thereof is distributed throughout the whole rubber and does not have a tendency to concentrate at the portion adjacent to the edges.

As shown, the bolts 50 pass freely through openings in the outer ring 41 and the nuts 51 may conveniently occupy recesses 44 in the outer face of this ring, providing for the reception of a suitable socket wrench for turning the nuts. Two methods of securing the bolt to the inner ring 40 are shown. In Fig. 5 the inner ring has threaded openings 45 and the threaded bolt is screwed into the ring until the shoulder, where the thread joins the body of the bolt, abuts the inner face of the ring, thus locking the bolts rigidly to the ring. A screw driver slot 53 in the outer end of the bolt furnishes convenient means for turning it into this position. In Fig. 6 the bolt 50 is shown as passing through an opening in the ring 40 and receiving on its end a nut 55, which occupies an annular groove 47 in the outer face of the ring. This groove prevents the nut rotating, so that the bolt may be turned into it.

Whether the bolt is secured to the inner ring in the manner shown in Fig. 5 or that shown in Fig. 6, the bolt, after being put in place, is preferably stationary, and the compression of the rubber ring is effected solely by turning the outer nuts 51.

My fastening device is adapted to be placed on the market as a complete self-contained article of manufacture, comprising the rubber ring 30, the metallic rings 40 and 41, the bolts 50 (threaded into the ring 40 or having the nuts 55), and the outer nuts 51, fully assembled as shown in Fig. 7 and ready for installation. When sold the rubber of this device will be substantially uncompressed and the radial dimension of the rubber and the rings will be less than the distance between the wheel centers and tires to be used.

With existing sizes of wheel centers and tires varying by two inches in diameter, the radial dimension across my device will be somewhat less than one inch, preferably substantially seven eighths of an inch. This allows sufficient clearance for easily shoving the inner fastening ring and the rubber ring into the annular space allowed. At the same time, a few turns of the nuts 51 are sufficient to compress the rubber ring to take up all the clearance and form an effective lock. I prefer to so proportion the parts that when the device is locked the outer edges of the metallic rings are within the outermost plane of the tire-carrying rim, and are thus protected thereby.

While this fastening device is very simple and may be readily installed, and while a hand wrench for the nuts may furnish sufficient power and force therefor, I have found by actual practice that the rubber is compressed so firmly against the wheel center and tire base that it would require a force greater than that of the ordinary hydraulic press to separate them. The fastening effectively resists all strains occurring in the running of the vehicle and absolutely prevents any displacement of the tire. Notwithstanding this firm securing, there is a material radial play of the rim on the center as the wheel rotates and the point of load-support changes, and experience has demonstrated that the cushion thus provided greatly lessens the jar on the vehicle with corresponding lengthening of the life thereof, as well as increasing the mileage capacity of the tire.

I am aware that it has been proposed, in pleasure cars, to provide flanges on the outer rim or wheel center, or both, and secure such flange or flanges to a rubber ring, but the metallic connection between the inner or outer rim and the fastening device has materially interfered with any cushioning effect of the rubber ring. Moreover, such wheels with which I am familiar, have not allowed the easy installation and removal of the fastening device, which is present in my invention, nor have they provided a fastening device which may be placed on the market as a self-contained article of manufacture, ready for use between wheel centers and tires of usual shapes or standard sizes.

Having thus described my invention, what I claim is:

1. As a new article of manufacture, a self-contained cushioning and fastening device independent of but adapted for use between a wheel center and tire-carrying rim, comprising an intermediate rubber cushion, pressure distributing rings engaging the opposite sides thereof, the rubber cushion extending continuously from one of said rings to the other, means extending through said cushion and engaging said pressure distributing rings adapted to draw said pressure distributing rings toward each other and thereby compress the intermediate cushion to exert a radial expansive action simultaneously inwardly and outwardly between the wheel center and the tire-carrying rim while the pressure distributing rings are out of contact with the wheel center and tire-carrying rim, thereby obviating any rigid connection between the wheel and tire and maintaining an unobstructed cushion effect.

2. The combination with a wheel center having a cylindrical exterior and a tire carrying rim having a cylindrical interior, the diameter of said interior being materially greater than the exterior diameter of the wheel center, and a self-contained cushioning and fastening device adapted to be slid laterally into place between the wheel center and rim and comprising a laterally continuous rubber cushion, pressure distributing rings on opposite sides of said cushion, at least one of such rings having a less radial dimension than the radial distance across the annular space between the wheel center and rim, and means adapted to force said pressure distributing rings toward each other to compress the cushion laterally and cause it to expand radially inwardly and outwardly while the pressure distributing rings remain out of contact with both the wheel center and the rim and therefore do not interfere with the free movement of the cushion.

3. A self-contained cushioning and fastening device for securing a tire to a wheel center and allowing its ready removal therefrom comprising an elastic cushion in the form of a ring of rubber having a cylindrical inner and outer periphery and adapted to stand between the wheel center and tire, pressure distributing rings engaging the opposite sides of the elastic ring, at least one of said pressure distributing rings being not materially larger in radial dimension than the elastic ring, whereby such pressure distributing ring and the elastic ring may be shoved laterally into place between the wheel center and tire, bolts passing through the elastic ring in a position parallel to the axis of the wheel, means for securing said bolts to one of the pressure distributing rings, and nuts screwing onto the other ends of said bolts and bearing against the outer face of the other pressure distributing ring.

4. The combination of a wheel center, a tire surrounding the same, a laterally continuous cushioning member adapted to stand between the wheel center and tire, a pair of pressure distributing rings engaging the opposite sides of the cushioning member, each of said rings being independent of the tire and wheel center and having the edges of the cushion-engaging face beveled or reduced, and means for forcing said rings together to expand the cushioning member inwardly and outwardly.

In testimony whereof, I hereunto affix my signature.

ADELBERT HAUSCHILD.